US012607734B2

(12) United States Patent
Loesch et al.

(10) Patent No.: US 12,607,734 B2
(45) Date of Patent: Apr. 21, 2026

(54) RADAR DEVICE AND RADAR METHOD

(71) Applicant: Robert Bosch GmbH, Stuttgart (DE)

(72) Inventors: Benedikt Loesch, Stuttgart (DE);
Arthur Hipke, Leonberg (DE);
Michael Schoor, Stuttgart (DE)

(73) Assignee: ROBERT BOSCH GMBH, Stuttgart
(DE)

( * ) Notice: Subject to any disclaimer, the term of this
patent is extended or adjusted under 35
U.S.C. 154(b) by 654 days.

(21) Appl. No.: 18/051,726

(22) Filed: Nov. 1, 2022

(65) Prior Publication Data

US 2023/0140503 A1 May 4, 2023

(30) Foreign Application Priority Data

Nov. 3, 2021 (DE) ..................... 10 2021 212 390.2

(51) Int. Cl.
*G01S 13/42* (2006.01)
(52) U.S. Cl.
CPC .................................... *G01S 13/42* (2013.01)
(58) Field of Classification Search
CPC ....................................................... G01S 13/42
See application file for complete search history.

(56) References Cited

U.S. PATENT DOCUMENTS 8,436,763 B2     5/2013   Wintermantel
2019/0011532 A1*   1/2019   Loesch ................ H01Q 1/3233

2020/0076084 A1*   3/2020   Batel .................... H01Q 19/108
2020/0096626 A1*   3/2020   Wang .................. G01S 13/4454
2020/0287291 A1*   9/2020   Yang ...................... H01Q 1/523
2021/0199754 A1*   7/2021   Murakami ............... H04B 7/06
2022/0069477 A1*   3/2022   Maruyama ........... H01Q 21/065

FOREIGN PATENT DOCUMENTS

WO        2015197222 A1   12/2015
WO        2015197226 A1   12/2015

OTHER PUBLICATIONS

Cox et al., "Robust Adaptive Beamforming," IEEE Transactions on
Acoustics, Speech and Signal Processing, vol. 35, No. 10, 1987, pp.
1365-1376.
Capon, "High-Resolution Frequency-Wavenumber Spectrum Analy-
sis," Proceedings of the IEEE, vol. 57, No. 8, 1969, pp. 1408-1418.
<https://epsc.wustl.edu/~ggeuler/reading/cam_noise_biblio/capon_
1969-IEEE-high-resolution_frequency-wavenumber_spectrum_
analysis.pdf> Downloaded Oct. 28, 2022.

* cited by examiner

*Primary Examiner* — Vladimir Magloire
*Assistant Examiner* — Nazra Nur Waheed
(74) *Attorney, Agent, or Firm* — NORTON ROSE
FULBRIGHT US LLP

(57) ABSTRACT

A radar device including a transceiver unit that includes a
plurality of receiving antennas and a plurality of transmitting
antennas, a distance between at least two transmitting anten-
nas being shorter than a greatest distance of distances
between two receiving antennas, the transmitting antennas
being vertically offset with respect to the receiving antennas.
The radar device further includes a control unit, which is
configured to activate the transceiver unit in order to operate
the transceiver unit with the aid of a transmitting-side beam
steering method.

14 Claims, 3 Drawing Sheets

RADAR DEVICE AND RADAR METHOD

CROSS REFERENCE

The present application claims the benefit under 35 U.S.C. § 119 of German Patent Application No. DE 10 2021 212 390.2 filed on Nov. 3, 2021, which is expressly incorporated herein by reference in its entirety.

FIELD

The present invention relates to a radar device and to a radar method.

BACKGROUND INFORMATION

For surroundings monitoring in driver assistance systems, the azimuth angle and elevation angle, in addition to the distance and to the relative velocity, are also of major importance, since by this means, a lane assignment may be carried out and a determination may be made about the relevance of the target. Thus, it may be ascertained whether an object may be driven over, may be driven against or may be driven under.

Azimuth and elevation angles of the targets may be ascertained from amplitudes and/or from phase differences of transmitting antennas and/or receiving antennas of an antenna array. In order to improve the accuracy and separability of the angle estimation, the MIMO principle (multiple input multiple output) may be used. In contrast to classical SIMO radars (single input multiple output) including one transmitting antenna and multiple receiving antennas, multiple transmitting antennas and multiple receiving antennas are used for this purpose.

In the angle estimation, the received signals are compared with a previously measured angle-dependent antenna diagram. In the event that only one target is located in a (d,v) cell, d referring to the distance and v to the relative velocity, the estimated angle results as the position of the best match between the received signal and the antenna diagram.

A MIMO radar sensor is described in U.S. Pat. No. 8,436,763 B2, which uses the MIMO principle including code multiplex and two transmitting antennas in order to improve the azimuth angle estimation. In this case, the two transmitting antennas are situated at the left and the right edge of the entire array in order in this way to obtain a preferably large virtual aperture.

In order to increase the range or detection performance of radar sensors, beam steering (TX beam steering) on the transmitting side may be used. In this case, the transmitters are simultaneously activated and with the aid of TX phase shifters, it is possible to influence the resulting directional pattern. With large distances between the transmitters, the resulting directional pattern is very narrow and numerous side lobes result.

Beam steering methods on the transmitting side are described by Van Trees, "Optimum array processing—Part IV of detection, estimation and modulation theory," John Wiley, 2002, Capon, "High-Resolution Frequency—Wavenumber Spectrum Analysis," Proceedings of the IEEE, 1969, vol. 57, pp. 1408-1418, and Cox et al., "Robust adaptive beamforming," IEEE Transactions on Acoustics, Speech and Signal Processing, vol. 35, no. 10, pp. 1365-1376, 1987.

A method for determining a relative velocity of a radar target is described in PCT Patent Application No. WO 2015/197222 A1. PCT Patent Application No. WO 2015/197226 A1 relates to a MIMO radar measuring method.

SUMMARY

The present invention provides a radar device and a radar method.

Advantageous refinements of the present invention are disclosed herein.

According to one first aspect, the present invention relates to a radar device including a transceiver unit that includes a plurality of receiving antennas and a plurality of transmitting antennas, a distance between at least two of the transmitting antennas being shorter than a greatest distance of distances between two receiving antennas, the transmitting antennas being vertically offset with respect to the receiving antennas. According to an example embodiment of the present invention, the radar device further includes a control unit, which is designed to activate the transceiver unit in order to operate the transceiver unit with the aid of a transmitting-side beam steering method.

According to one second aspect, the present invention relates to a radar method. According to an example embodiment of the present invention, radar radiation is emitted by a transceiver unit, including a plurality of receiving antennas and a plurality of transmitting antennas, a distance between at least two transmitting antennas being shorter than a greatest distance of distances between two receiving antennas, the transmitting antennas being vertically offset with respect to the receiving antennas, and the transceiver unit being capable of being operated with the aid of a transmitting-side beam steering method. Reflected radar radiation is received by the transceiver unit.

The present invention provides a compact MIMO radar device having the capability of beam steering (TX beam steering) on the transmitting side.

By using at least two transmitting antennas at a relatively short distance from one another, it is possible to prevent the occurrence of too many distorting side lobes. The transmitting antennas may be utilized in order to influence the directional pattern on the transmitting side and thus to achieve a greater range.

The distance in this case may, for example, be a horizontal distance, which is measured with respect to the centers of the transmitting antennas and receiving antennas. The distance in this case is shorter than the distance between the outermost receiving antennas, so that these two transmitting antennas are not positioned to the left and right of the receiving array.

Positioning the entire transmitting array to the left or to the right next to the transmitting array increases the horizontal dimension of the radar device. The fact that the transmitting antennas exhibit a vertical offset relative to the receiving antennas may therefore ensure a compact design in the horizontal direction.

According to one further specific example embodiment of the radar device of the present invention, the receiving antennas are positioned above the transmitting antennas and overlap in their horizontal extension entirely or partially with one or with multiple transmitting antennas. As a result, it is possible to reduce the horizontal dimension of the radar device. Alternatively, the receiving antennas are positioned below the transmitting antennas.

According to one further specific example embodiment of the radar device of the present invention, at least two receiving antennas also exhibit a small horizontal distance in order to enable in the operating mode as well an unambiguous azimuth angle estimation using the transmitting-side beam steering method.

According to one further specific example embodiment of the radar device of the present invention, the control unit is integrated into a monolithic microwave integrated circuit (MMIC). This circuit may be located in the center between the transmitting antennas and the receiving antennas. The leads to the antenna elements may then be kept particularly short.

According to one further specific example embodiment of the radar device of the present invention, the distance between at least two transmitting antennas is five times shorter than a maximum wavelength of radar radiation emitted by the transceiver unit, preferably twice as short as the maximum wavelength of the radar radiation emitted by the transceiver unit.

According to one further specific example embodiment of the radar device of the present invention, the control unit is further designed to activate the transceiver unit in order to operate the transceiver unit without the transmitting-side beam steering method. The transceiver unit is thus able to be operated in multiple operating modes, in addition to the operating mode using a beam steering method, an operating mode using a standard operation without the beam steering method also being capable of being used. In the standard operation, the multiple transmitting antennas are used to increase the aperture and to improve the unambiguity in the angle estimation. At the same time, using a Joint Sampling Frequency Modulated Continuous Wave (JS-FMCW) modulation, the transmitting antennas may be utilized for improving the velocity estimation, as is described in PCT Patent Application Nos. WO 2015/197222 A1 and WO 2015/197226 A1.

According to one further specific example embodiment of the radar device of the present invention, the control unit is further designed to activate the transceiver unit in order to alternate in a time multiplex method between the operation of the transceiver unit with the transmitting-side beam steering method (first operating mode) and the operation without the transmitting-side beam steering method (second operating mode). This may represent one further possible operating mode. In this case, the switch between the first operating mode and the second operating mode may take place between two chirps or cyclically.

According to one further specific example embodiment of the radar device of the present invention, the control unit may also be designed to activate the transceiver unit in order to operate a first subset of the transmitting antennas with the transmitting-side beam steering method, and to operate a second subset of the transmitting antennas different from the first subset without the transmitting-side beam steering method.

According to one further specific example embodiment of the radar device of the present invention, a plurality of the transmitting antennas are situated horizontally next to one another, at least one further transmitting antenna being situated vertically offset to the horizontally situated transmitting antennas, and the radar device including an evaluation unit, which is designed to estimate an elevation angle and an azimuth angle of at least one target based on radar data, which are generated by the transceiver unit.

According to one further specific example embodiment of the radar device of the present invention, the transceiver unit includes at least three transmitting antennas and at least three receiving antennas. As a result, it is possible to improve the adjustment of the directional pattern in the transmitting-side beam steering method.

According to one further specific example embodiment of the radar device of the present invention, the control unit is situated spatially between the transmitting antennas and the receiving antennas. In this way, the length of the leads may be reduced.

According to one further specific example embodiment of the radar device of the present invention, the transmitting antennas and the receiving antennas include planar patch antennas, waveguide antennas and/or horn antennas.

According to one further specific example embodiment of the radar device of the present invention, the transceiver unit includes transmitting-side phase shifters, the control unit being designed to adjust a directional pattern of radar radiation emitted by the transmitting antennas by activating the transmitting-side phase shifters for operating the transceiver unit with the aid of the transmitting-side beam steering method.

Further advantages, features and details of the present invention result from the following description, in which different exemplary embodiments are described in detail with reference to the figures.

Figure 1:
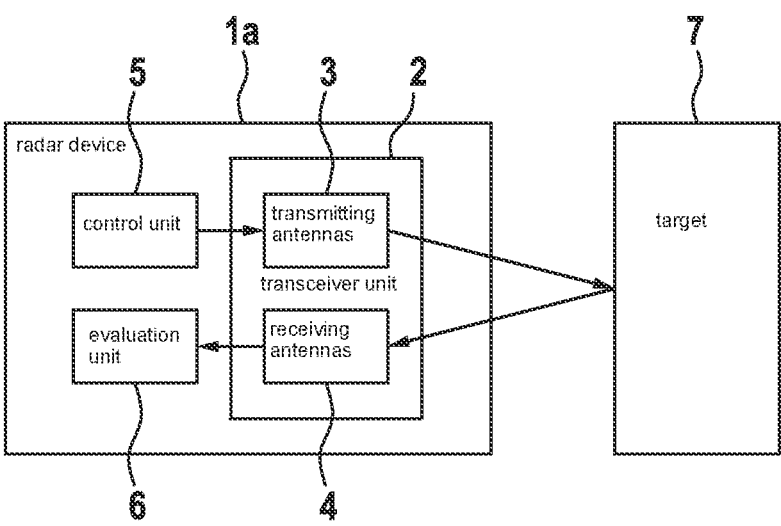
FIG. 1 schematically shows a block diagram of a radar device according to one specific example embodiment of the present invention.

In all figures, identical or functionally identical elements and devices are provided with the same reference numerals. The numbering of method steps is used for the sake of clarity and in general is not intended to imply any particular chronological sequence. Multiple method steps may, in particular, also be carried out simultaneously.

DETAILED DESCRIPTION OF EXAMPLE EMBODIMENTS

FIG. 1 schematically shows a block diagram of a radar device 1a including a transceiver unit 2. The latter includes a plurality of receiving antennas 4 and a plurality of transmitting antennas 3.

A distance between at least two of transmitting antennas 3 in the horizontal direction is shorter in this case than the horizontal distance between receiving antennas 4 furthest away from one another. The distance in this case is measured with respect to the center of the respective antennas. Furthermore, transmitting antennas 3 are vertically offset with respect to receiving antennas 4. For example, transmitting antennas 3 may be situated above receiving antennas 4 or vice versa.

Radar device 1a further includes a control unit 5, which activates transceiver unit 2. Transceiver unit 2 in this case may be operated in different operating modes. In a first operating mode, a transmitting-side beam steering method is used. For this purpose, transceiver unit 2 includes transmitting-side phase shifters. Control unit 5 adjusts a directional pattern of radar radiation emitted by transmitting antennas 3 by activating the transmitting-side phase shifters.

In a second operating mode, a standard method is applied without a transmitting-side beam steering method. In a third operating mode, a subset of transmitting antennas 3 may be operated in the first operating mode and a further subset of transmitting antennas 3 may be operated in the second operating mode. A time multiplex method is also possible, a switch being made between the first and the second operating mode.

Radar device 1a further includes an evaluation unit 6, which ascertains an azimuth angle and, optionally, an elevation angle of a target 7. In the process, radar data are evaluated, which are generated based on the radar radiation received by receiving antennas 4.

The present invention is not limited to a particular number of receiving antennas 4 and transmitting antennas 3. The higher the number of transmitting antennas 3 is, which may be utilized for the transmitting-side beam steering method, the greater is the gain of the signal-to-noise ratio with respect to a preferred direction.

Figure 2:
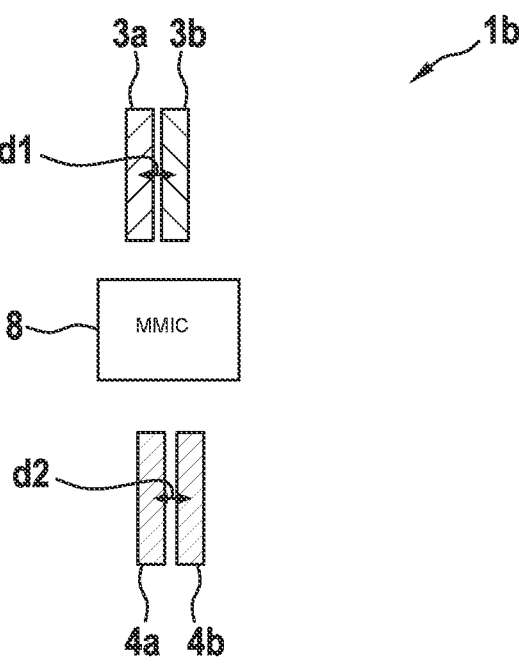
FIG. 2 schematically shows a top view of a radar device according to one further specific example embodiment of the present invention.

FIG. 2 schematically shows a top view of a radar device 1b. Here, two transmitting antennas 3a, 3b are situated horizontally at a first distance d1 next to one another. Furthermore, two receiving antennas 4a, 4b are situated horizontally at a second distance d2 next to one another and vertically offset with respect to transmitting antennas 3a, 3b. An MMIC 8, which includes control unit 5 and evaluation unit 6, is situated between transmitting antennas 3a, 3b and receiving antennas 4a, 4b.

First transmitting antenna 3 exhibits a horizontal overlap with first receiving antenna 4a. Second transmitting antenna 3b exhibits a horizontal overlap with second receiving antenna 4b. First distance d1 is shorter than second distance d2.

Figure 3:
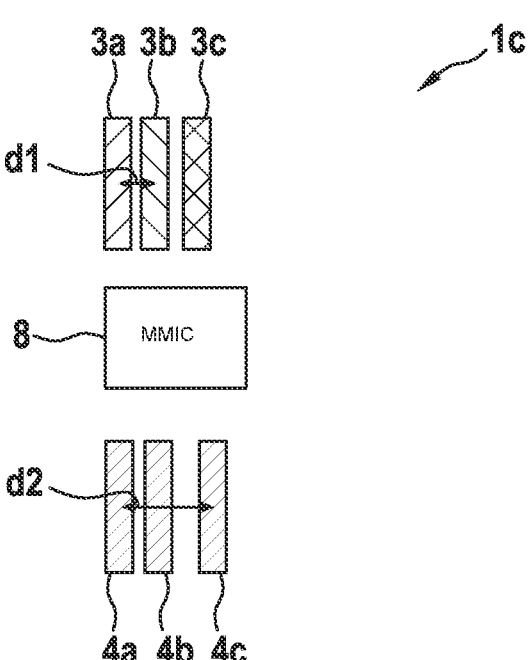
FIG. 3 schematically shows a top view of a radar device according to one further specific example embodiment of the present invention.

FIG. 3 schematically shows a top view of a further radar device 1c. This radar device includes a third transmitting antenna 3c and a third receiving antenna 4c. With these additional antennas, it is possible to achieve a better performance in the transmitting-side beam steering method. An increase in the number of receiving antennas further improves the angle estimation both in the normal operating mode as well as in the beam steering method. Distance d1 between first transmitting antenna 3a and second transmitting antenna 3b is shorter than a distance d2 between the two outermost receiving antennas 4a, 4c.

Figure 4:
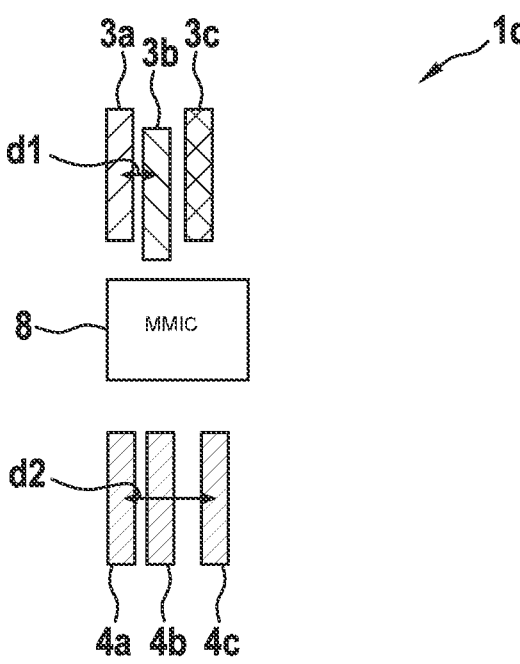
FIG. 4 schematically shows a top view of a radar device according to one further specific example embodiment of the present invention.

FIG. 4 schematically shows a top view of a further radar device 1d. In this case, second transmitting antenna 3b is vertically offset relative to first transmitting antenna 3a and to third transmitting antenna 3c. This also enables a determination of the elevation angle and/or a tracking of the emitted radar beam in the elevation direction by adjusting a phase difference between second transmitting antenna 3b relative to first transmitting antenna 3a and to third transmitting antenna 3c. In this way, it is possible in the transmitting-side beam-steering method to change the directional pattern in the elevation direction, in the standard mode an elevation angle may be estimated.

The arrangements shown in FIGS. 2 through 4 may alternatively also be implemented by positioning receiving antennas 4a through 4c above transmitting antennas 3a through 3c.

Transmitting antennas and receiving antennas 3a through 3c, 4a through 4c may be implemented as planar patch antennas on a circuit board, as waveguide antennas or as horn antennas.

Figure 5:
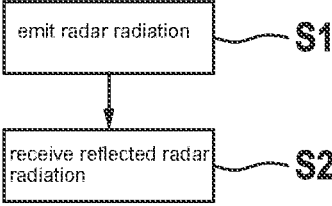
FIG. 5 shows a flowchart of a radar method according to one specific example embodiment of the present invention.

FIG. 5 shows a flowchart of a radar method. In a first method step S1, radar radiation is emitted by a transceiver unit 2. Transceiver unit 2 may be part of a radar device 1a through 1d described above. Conversely, radar devices 1a through 1d described above may be designed to carry out the radar method described below.

Transceiver unit 2 includes a plurality of receiving antennas 4 and a plurality of transmitting antennas 3, respectively, a distance between at least two of transmitting antennas 3 being shorter than a greatest distance of distances between two receiving antennas 4.

Transmitting antennas 3 are further vertically offset with respect to receiving antennas 4. Transceiver unit 2 may be operated with the aid of a transmitting-side beam steering method.

In a second step S2, reflected radar radiation is received by the transceiver unit.

Further operating modes are possible, for example, the above-described standard operation without the transmitting-side beam steering method, a partial operation of transmitting antennas 3 in the transmitting-side beam steering method or a temporal alternation between the transmitting-side beam steering method and the standard operation.

In the transmitting-side beam steering method, control unit 5 may determine and optimize coefficients (amplitude and phase) to be adjusted in a variety of ways in order to achieve different objectives. Thus, a fixed preferred direction, for example, 0°, may be set. The preferred direction may also be adaptively adjusted. Furthermore, an adjustment of the sensor misalignment as a function of the misalignment estimation of radar device 1a through 1d is also possible. The preferred direction may also be set as a function of the road course, which is ascertained from radar data, video data, LIDAR data or from a map. A desired target object may also be tracked. It is possible to set a preferred direction while simultaneously suppressing undesirable target directions. Furthermore, the detection performance for particular targets may be improved upon by suppressing specular paths at guardrails or tunnel walls. For this purpose, the course of the guardrail or of the tunnel wall known from the surroundings detection and the direction of the desired targets may be utilized in order to ascertain the direction of the specular path and to then suppress the latter in a targeted manner.

In determining the coefficients, it is possible to use different methods, such as Delay-and-Sum Beamforming, Minimum Variance Distortionless Response Beamformer (MVDR), Zero Beamforming, etc.

What is claimed is:

1. A radar device, comprising:
   a transceiver unit including a plurality of receiving antennas and a plurality of transmitting antennas, a distance between at least two of the transmitting antennas being shorter than a greatest distance of distances between two of the receiving antennas, and the plurality of transmitting antennas being vertically offset with respect to the plurality of receiving antennas; and
   a control unit configured to activate the transceiver unit to operate the transceiver unit such that a first subset of the plurality of transmitting antennas are operated according to a first operating mode and a second subset of the plurality of transmitting antennas are operated according to a second operating mode, the second subset being different from the first subset and the second operating mode being different from the first operating mode, wherein the plurality of transmitting antennas comprises a first transmitting antenna, a second transmitting antenna, and a third transmitting antenna, wherein the first transmitting antenna and the third transmitting antenna are aligned in a vertical direction, wherein the second transmitting antenna is situated between the first transmitting antenna and the third transmitting antenna in a horizontal direction, and wherein the second transmitting antenna is vertically offset by a predetermined distance with respect to both the first transmitting antenna and the third transmitting antenna.

2. The radar device as recited in claim 1, wherein a distance between at least two of the transmitting antennas is five times shorter than a maximum wavelength of a radar radiation emitted by the transceiver unit.

3. The radar device as recited in claim 1, wherein a distance between at least two of the transmitting antennas is twice as short as the maximum wavelength of the radar radiation emitted by the transceiver unit.

4. The radar device as recited in claim 1, wherein the radar device includes an evaluation unit, which is configured to estimate an elevation angle and an azimuth angle of at least one target based on radar data, which is generated by the transceiver unit.

5. The radar device as recited in claim 1, wherein the transceiver unit includes at least three transmitting antennas and at least three receiving antennas.

6. The radar device as recited in claim 1, wherein the control unit is situated spatially between the plurality of transmitting antennas and the plurality of receiving antennas.

7. The radar device as recited in claim 1, wherein the plurality of transmitting antennas and the plurality of receiving antennas include at least one of: planar patch antennas, waveguide antennas and horn antennas.

8. The radar device as recited in claim 1, wherein the transceiver unit includes transmitting-side phase shifters, and the control unit is configured to adjust a directional pattern of radar radiation emitted by the plurality of transmitting antennas by activating the phase shifters on a transmitting side for operating the transceiver unit using a transmitting-side beam steering method.

9. The radar device as recited in claim 1, wherein to operate the first subset of transmitting antennas according to the first operating mode includes to operate the first subset of transmitting antennas using a transmitting-side beam steering method.

10. The radar device as recited in claim 9, wherein to operate the second subset of the plurality of transmitting antennas according to the second operating mode includes to operate the second subset of the plurality of transmitting antennas without a transmitting-side beam steering method.

11. The radar device as recited in claim 10, wherein the control unit is configured to activate the transceiver unit to alternate in a time multiplex method between the operation of the transceiver unit with the transmitting-side beam steering method and without the transmitting-side beam steering method.

12. The radar device as recited in claim 1, wherein the first subset of the plurality of transmitting antennas are operated according to the first operating mode while the second subset of the plurality of transmitting antennas are simultaneously operated according to the second operating mode.

13. A radar method, comprising the following steps:

emitting radar radiation via a transceiver unit that includes a plurality of receiving antennas and a plurality of transmitting antennas, a distance between at least two of the plurality of transmitting antennas being shorter than a greatest distance of distances between two of the plurality of receiving antennas, the plurality of transmitting antennas being vertically offset with respect to the plurality of receiving antennas, and the transceiver unit operating a first subset of the plurality of transmitting antennas according to a first operating mode and a second subset of the plurality of transmitting antennas according to a second operating mode, the second subset being different from the first subset and the second operating mode being different from the first operating mode; and receiving reflected radar radiation via the transceiver unit, wherein the plurality of transmitting antennas comprises a first transmitting antenna, a second transmitting antenna, and a third transmitting antenna, wherein the first transmitting antenna and the third transmitting antenna are aligned in a vertical direction, wherein the second transmitting antenna is situated between the first transmitting antenna and the third transmitting antenna in a horizontal direction, and wherein the second transmitting antenna is vertically offset by a predetermined distance with respect to both the first transmitting antenna and the third transmitting antenna.

14. The radar method of claim 13, wherein operating the first subset of transmitting antennas according to the first operating mode includes operating the first subset of transmitting antennas using a transmitting-side beam steering method.

* * * * *